United States Patent
Emonts et al.

(10) Patent No.: US 7,181,396 B2
(45) Date of Patent: Feb. 20, 2007

(54) SYSTEM AND METHOD FOR SPEECH RECOGNITION UTILIZING A MERGED DICTIONARY

(75) Inventors: Michael Emonts, San Jose, CA (US); Xavier Menendez-Pidal, Los Gatos, CA (US); Lex Olorenshaw, Half Moon Bay, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 326 days.

(21) Appl. No.: 10/395,492

(22) Filed: Mar. 24, 2003

(65) Prior Publication Data

US 2004/0193416 A1 Sep. 30, 2004

(51) Int. Cl.
*G10L 15/28* (2006.01)
(52) U.S. Cl. .................................... 704/251
(58) Field of Classification Search .............. 704/9, 704/10, 243–244, 251, 255, 256
See application file for complete search history.

(56) References Cited

U.S. PATENT DOCUMENTS

| | | | | |
|---|---|---|---|---|
| 5,751,905 A | * | 5/1998 | Chen et al. | 704/254 |
| 5,835,888 A | * | 11/1998 | Kanevsky et al. | 704/9 |
| 6,192,333 B1 | * | 2/2001 | Pentheroudakis | 704/10 |
| 6,233,546 B1 | * | 5/2001 | Datig | 704/7 |
| 6,308,149 B1 | * | 10/2001 | Gaussier et al. | 704/9 |
| 6,510,410 B1 | * | 1/2003 | Chen et al. | 704/251 |
| 6,738,741 B2 | * | 5/2004 | Emam et al. | 704/251 |

\* cited by examiner

*Primary Examiner*—Angela Armstrong
(74) *Attorney, Agent, or Firm*—Gregory J. Koerner; Redwood Patent Law

(57) ABSTRACT

The present invention comprises a system and method for speech recognition utilizing a merged dictionary, and may include a recognizer that is configured to compare input speech data to a series of dictionary entries from the merged dictionary to detect a recognized phrase or command. The merged dictionary may be implemented by utilizing a merging technique that maps two or more related phrases or commands with similar meanings to a single one of the dictionary entries. The recognizer may thus achieve more accurate speech recognition accuracy by merging phrases or commands which might otherwise be erroneously mistaken for each other.

38 Claims, 8 Drawing Sheets

| COMMAND | MOOD |
|---|---|
| Command + No Particle | Abrupt/Assertive |
| Command + aa3 | Neutral |
| Command + laa1 | Polite Command/Request |

710

714, 716, 718

Particles

Fig. 7

SYSTEM AND METHOD FOR SPEECH RECOGNITION UTILIZING A MERGED DICTIONARY

BACKGROUND SECTION

1. Field of the Invention

This invention relates generally to electronic speech recognition systems, and relates more particularly to a system and method for speech recognition utilizing a merged dictionary.

2. Description of the Background Art

Implementing a robust and efficient method for system users to interface with electronic devices is a significant consideration of system designers and manufacturers. Voice-controlled operation of electronic devices is a desirable interface for many system users. For example, voice-controlled operation allows a user to perform other tasks simultaneously. For instance, a person may operate a vehicle and operate an electronic organizer by voice control at the same time. Hands-free operation of electronic systems may also be desirable for users who have physical limitations or other special requirements.

Hands-free operation of electronic devices may be implemented by various speech-activated electronic systems. Speech-activated electronic systems thus advantageously allow users to interface with electronic devices in situations where it would be inconvenient or potentially hazardous to utilize a traditional input device. Electronic entertainment systems may also utilize speech recognition techniques to allow users to interact with a system by speaking to it.

However, effectively implementing such systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits, to a system user, but may also place increased demands on the control and management of various system components. For example, an enhanced electronic system that effectively recognizes words and phrases in the Cantonese language may benefit from an efficient implementation because of the large amount and complexity of the digital data involved. Therefore, for all the foregoing reasons, implementing a robust and efficient method for a system user to interface with electronic devices remains a significant consideration of system designers and manufacturers.

SUMMARY

In accordance with the present invention, a system and method are disclosed for speech recognition utilizing a merged dictionary. In certain languages, including the Cantonese language of southern China, a phrase-ending particle may portray a speaker's mood while not changing the core meaning of a phrase or command. In accordance with the present invention, several different particle contexts may be defined for use in performing a merging technique for combining various related phrases with similar meanings.

For example, an assertive context may exist in which a particular command is not followed by any type of associated particle. The foregoing assertive context may indicate an abrupt or assertive mood of the speaker. In addition, a neutral-particle context may exist in which a particular command is followed by an associated neutral particle (such as "aa3"). The foregoing neutral-particle context may indicate a neutral mood of the speaker.

Furthermore, a polite-particle context may exist in which a particular command is followed by an associated polite particle (such as "laa1"). The foregoing polite-particle context may indicate a polite command or request as the mood of the speaker. In certain embodiments, commands associated with either the no-particle context, the neutral-particle context, and the polite-particle context may advantageously be mapped into a single polite-context dictionary entry in a vocabulary dictionary used during the speech recognition procedure.

Recognition errors during a speech recognition procedure may result from incorrect analysis of two or more such phonetically similar commands that are mistaken for each other. The merged dictionary of the present invention advantageously prevents incorrectly recognizing one similar phrase for another similar phrase by mapping similar phrases with the same basic meaning into the same command in the vocabulary dictionary used during the speech recognition procedure.

In addition, in certain embodiments, the merged dictionary may also merge two phonetically dissimilar phrases that have the same basic meaning into the same command. In various embodiments, the merged dictionary may also provide certain merging exceptions for particles that substantially change the meaning of a root phrase. A merged dictionary utilizing the foregoing techniques may thus be created to provide more accurate recognition of several variations of a single root phrase or command. The present invention thus provides an effective system and method for speech recognition utilizing a merged dictionary.

BRIEF DESCRIPTION OF THE DRAWINGS

FIG. 7 is a diagram illustrating commands with speech particles, in accordance with one embodiment of the present invention.

DETAILED DESCRIPTION

The present invention relates to an improvement in speech recognition systems. The following description is presented to enable one of ordinary skill in the art to make and use the invention and is provided in the context of a patent application and its requirements. Various modifications to the preferred embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for speech recognition utilizing a merged dictionary, and may include a recognizer that is configured to compare input speech data to a series of dictionary entries from the merged dictionary to thereby detect a recognized phrase or command. The merged dictionary may advantageously be implemented by utilizing a merging technique that maps two or more related phrases or commands with similar meanings to a single one of the dictionary entries. The recognizer may thus achieve more accurate speech recognition accuracy by merging phrases or commands which might otherwise be erroneously mistaken for each other.

Figure 1:
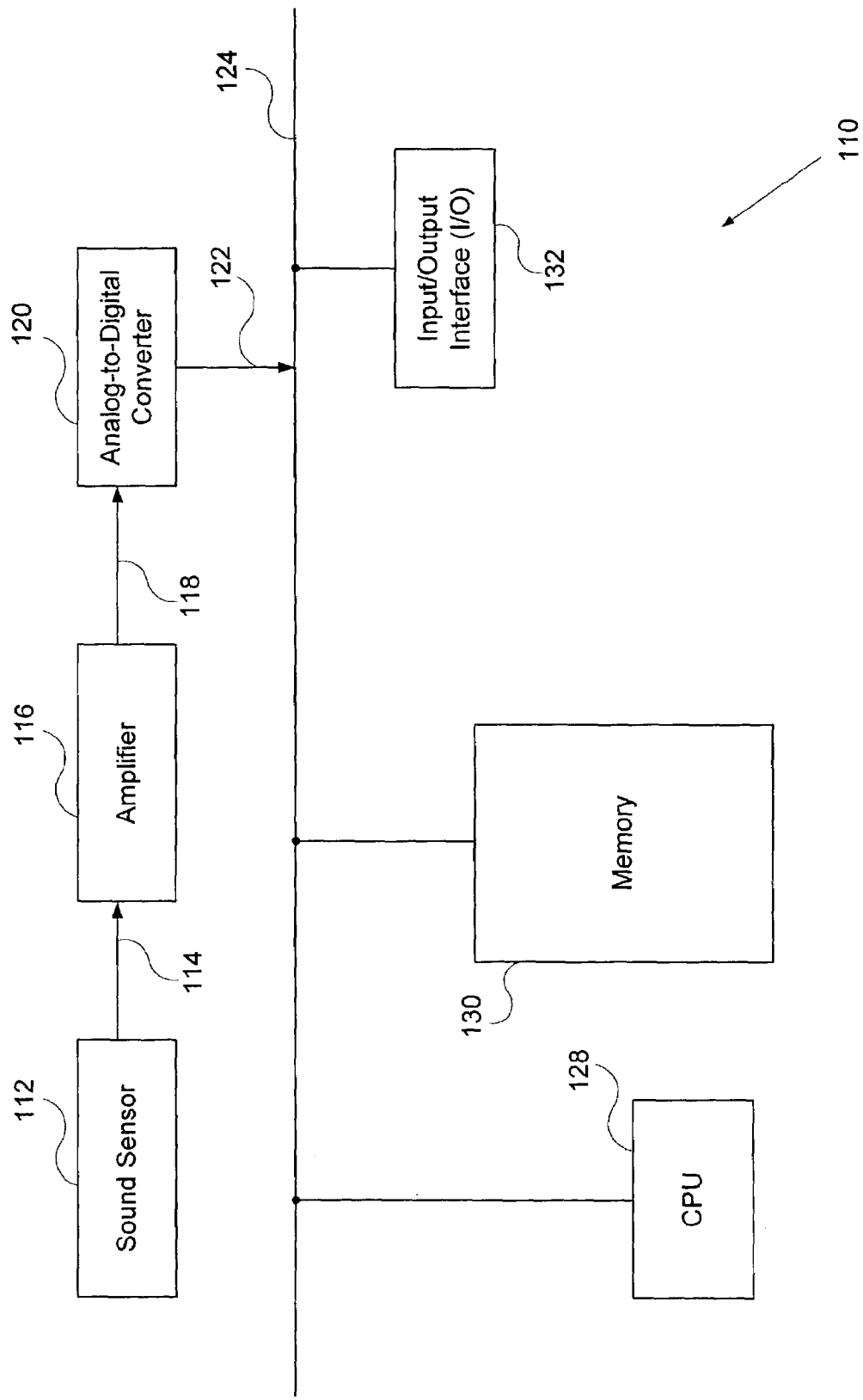
FIG. 1 is a block diagram for one embodiment of a computer system, in accordance with the present invention.

Referring now to FIG. 1, a block diagram for one embodiment of a computer system 110 is shown, according to the present invention. The FIG. 1 embodiment includes a sound sensor 112, an amplifier 116, an analog-to-digital converter 120, a central processing unit (CPU) 128, a memory 130, and an input/output interface 132. In alternate embodiments, computer system 110 may readily include various other elements or functionalities in addition to, or instead of, those elements or functionalities discussed in conjunction with the FIG. 1 embodiment.

Sound sensor 112 detects sound energy and converts the detected sound energy into an analog speech signal that is provided via line 114 to amplifier 116. Amplifier 116 amplifies the received analog speech signal and provides the amplified analog speech signal to analog-to-digital converter 120 via line 118. Analog-to-digital converter 120 then converts the amplified analog speech signal into corresponding digital speech data. Analog-to-digital converter 120 then provides the digital speech data via line 122 to system bus 124.

CPU 128 may then access the digital speech data on system bus 124 and responsively analyze and process the digital speech data to perform speech detection according to software instructions contained in memory 130. The operation of CPU 128 and the software instructions in memory 130 are further discussed below in conjunction with FIGS. 2–3. After the speech data is processed, CPU 128 may then provide the results of the speech detection analysis to other devices (not shown) via input/output interface 132. In alternate embodiments, the present invention may readily be embodied in various devices other than the computer system 110 shown in FIG. 1.

Figure 2:
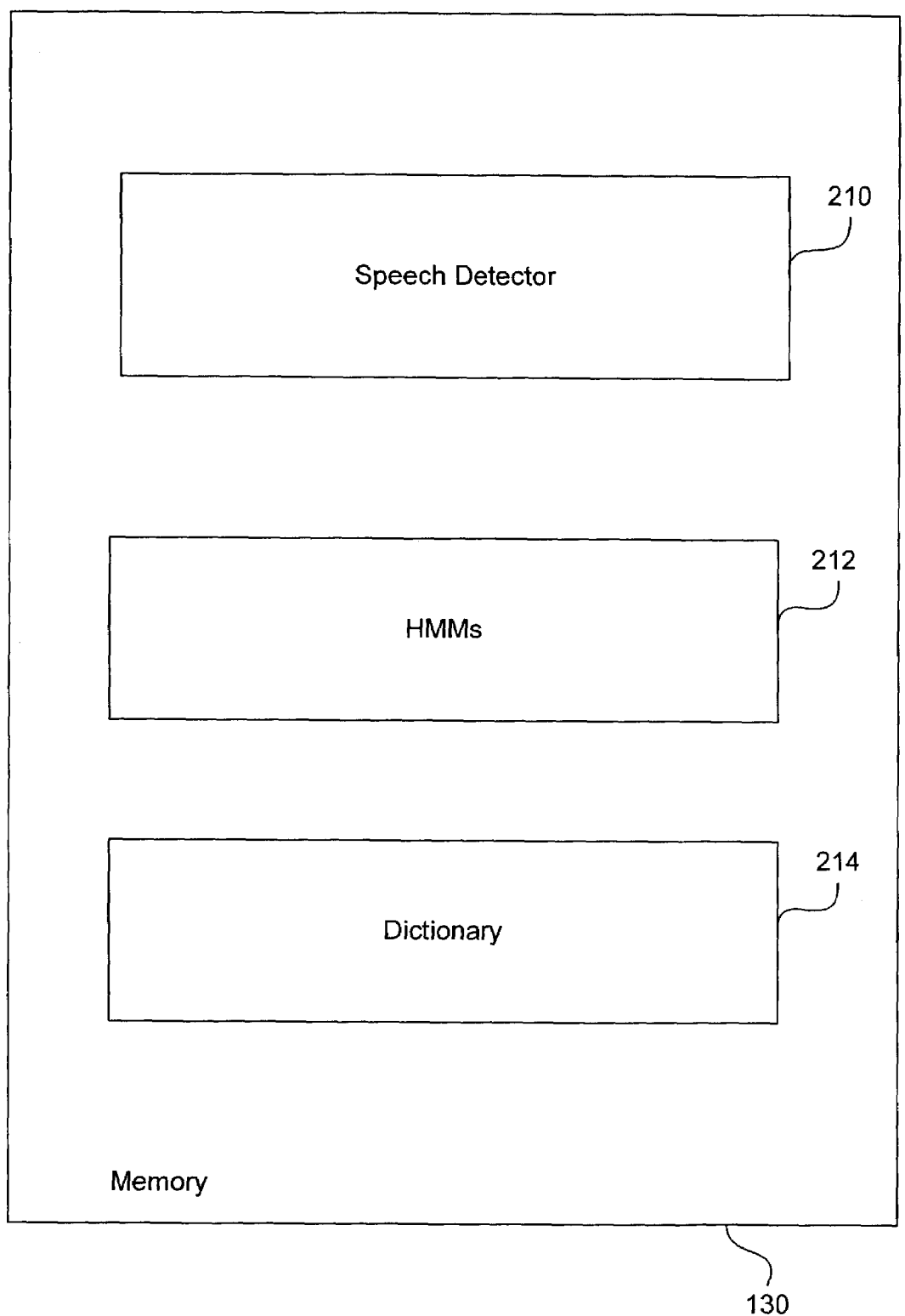
FIG. 2 is a block diagram for one embodiment of the memory of FIG. 1, in accordance with the present invention.

Referring now to FIG. 2, a block diagram for one embodiment of the memory 130 of FIG. 1 is shown, according to the present invention. Memory 130 may alternately comprise various storage-device configurations, including random access memory (RAM) and storage devices such as floppy discs or hard disc drives. In the FIG. 2 embodiment, memory 130 includes, but is not limited to, a speech detector 210, Hidden Markov Models (HMMs) 212, and a vocabulary dictionary 214. In alternate embodiments, memory 130 may readily include various other elements or functionalities in addition to, or instead of, those elements or functionalities discussed in conjunction with the FIG. 2 embodiment.

In the FIG. 2 embodiment, speech detector 210 includes a series of software modules that are executed by CPU 128 to analyze and recognize speech data, and which are further described below in conjunction with FIG. 3. In alternate embodiments, speech detector 210 may readily be implemented using various other software and/or hardware configurations. HMMs 212 and dictionary 214 may be utilized by speech detector 210 to implement the speech recognition functions of the present invention. One embodiment for HMMs 212 is further discussed below in conjunction with FIG. 4, and one embodiment for dictionary 214 is further discussed below in conjunction with FIG. 5.

Figure 3:
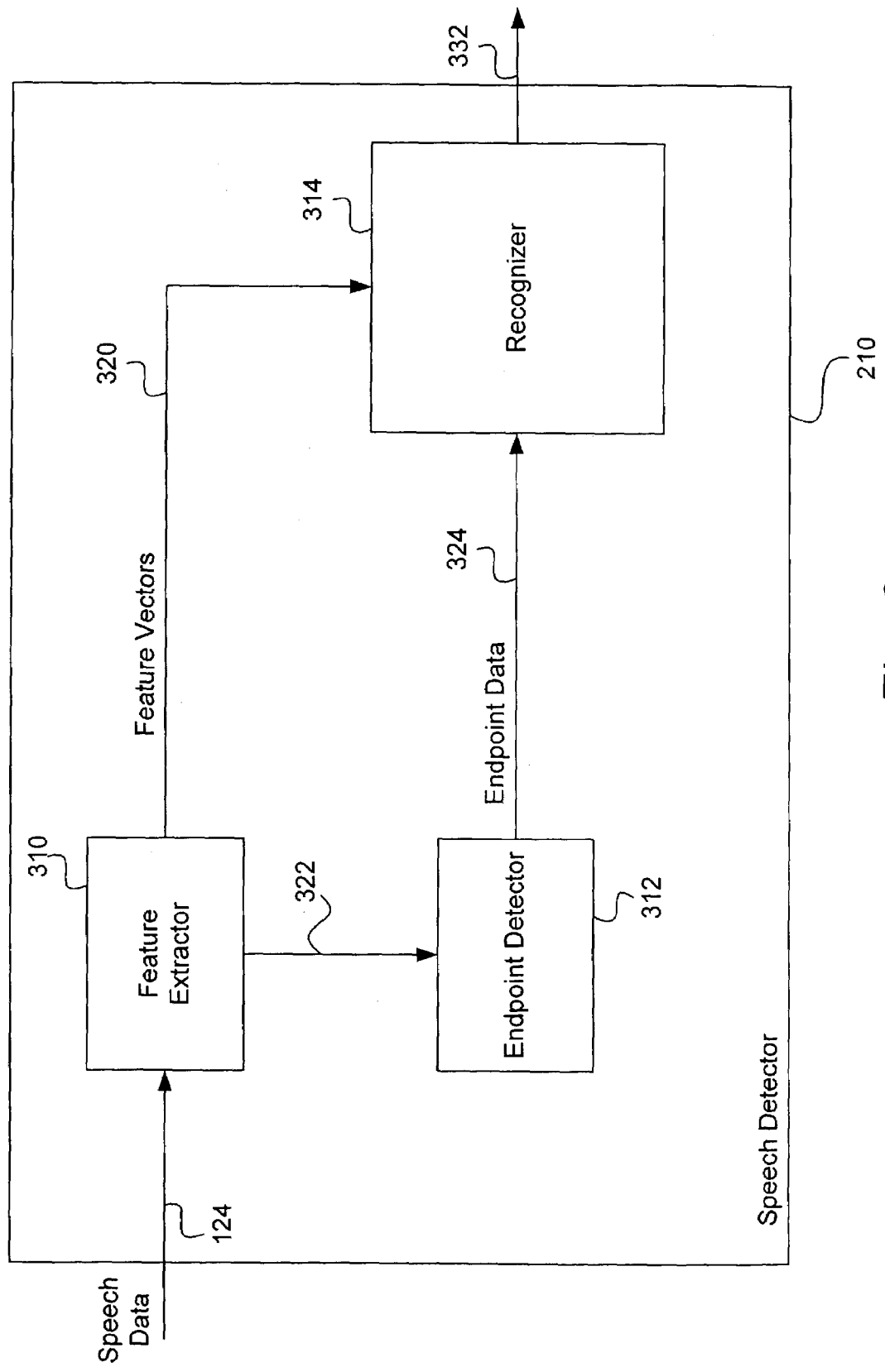
FIG. 3 is a block diagram for one embodiment of the speech detector of FIG. 2, in accordance with the present invention.

Referring now to FIG. 3, a block diagram for one embodiment of the speech detector 210 of FIG. 2 is shown, according to the present invention. Speech detector 210 includes, but is not limited to, a feature extractor 310, an endpoint detector 312, and a recognizer 314. In alternate embodiments, speech detector 210 may readily include various other elements or functionalities in addition to, or instead of, those elements or functionalities discussed in conjunction with the FIG. 3 embodiment.

In the FIG. 3 embodiment, an analog-to-digital converter 120 (FIG. 1) provides digital speech data to feature extractor 310 via system bus 124. Feature extractor 310 responsively generates feature vectors, which are provided to recognizer 314 via path 320. Feature extractor 310 further responsively generates speech energy to endpoint detector 312 via path 322. Endpoint detector 312 analyzes the speech energy and responsively determines endpoints of an utterance represented by the speech energy. The endpoints indicate the beginning and end of the utterance in time. Endpoint detector 312 then provides the endpoints to recognizer 314 via path 324.

Recognizer 314 is preferably configured to recognize commands in a predetermined vocabulary which is represented in dictionary 214 (FIG. 2). The foregoing vocabulary commands in dictionary 214 may correspond to any desired commands, instructions, or other communications for computer system 110. Recognized vocabulary commands may then be output to system 110 via path 332.

In practice, each command from dictionary 214 may be associated with a corresponding phone string (string of individual phones) which represents that word. Hidden Markov Models (HMMs) 212 (FIG. 2) may include trained stochastic representations for each of the phones from a pre-determined phone set that may effectively be utilized to represent the commands in dictionary 214. Recognizer 314 may then compare input feature vectors from line 320 with appropriate HMMs 212 for each of the phone strings from dictionary 214 to determine which command produces the highest recognition score. The command corresponding to the highest recognition score may thus be identified as the recognized command.

Figure 4:
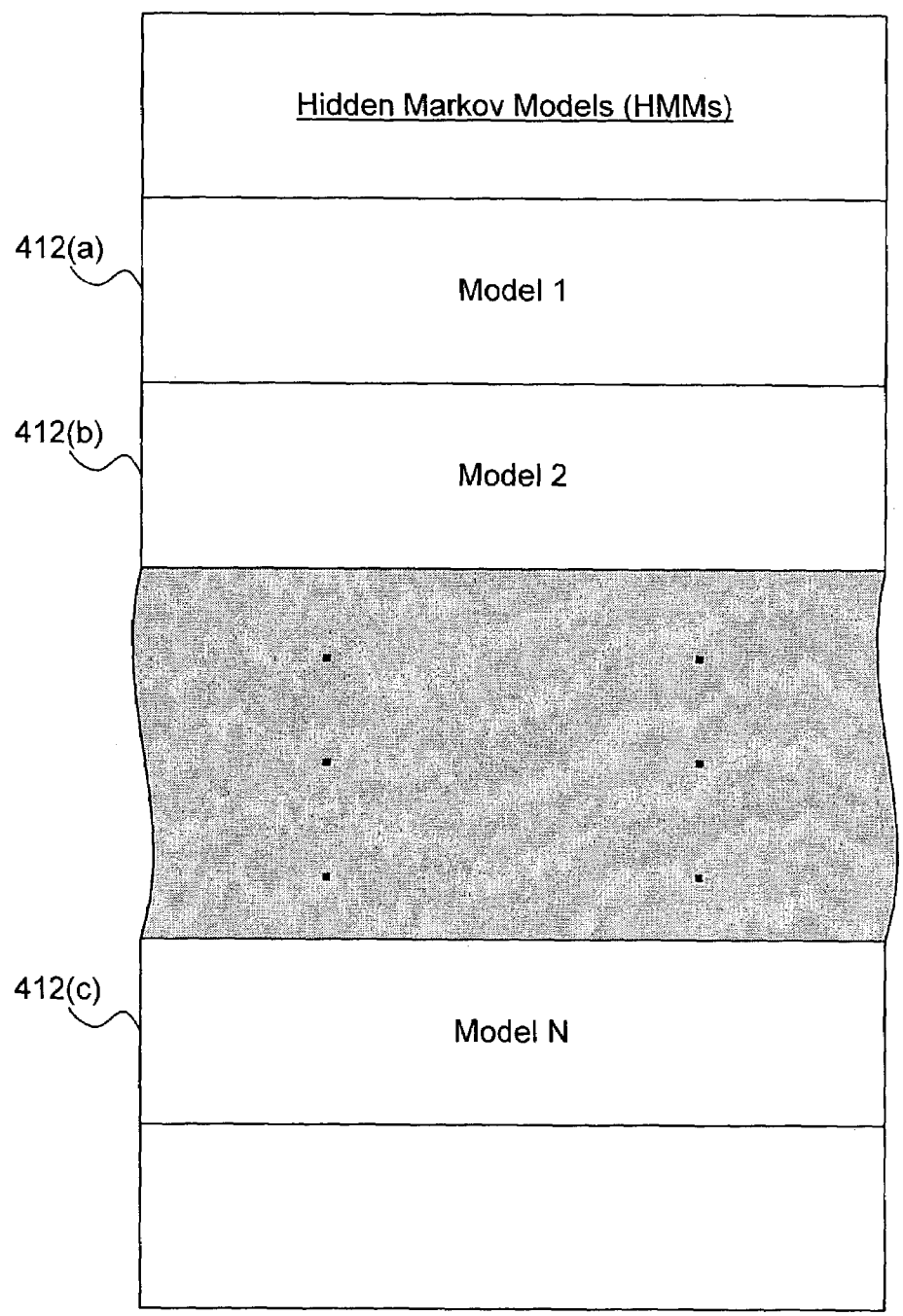
FIG. 4 is a diagram for one embodiment of the Hidden Markov Models of FIG. 2, in accordance with the present invention.

Referring now to FIG. 4, a block diagram for one embodiment of the HMMs 212 of FIG. 2 is shown, according to the present invention. In the FIG. 4 embodiment, HMMs 212 may preferably include a model 1 (412($a$)) through a model N (412($c$)). In alternate embodiments, HMMs 212 may readily include various other elements or functionalities in addition to, or instead of, those elements or functionalities discussed in conjunction with the FIG. 4 embodiment.

In the FIG. 4 embodiment, HMMs 212 may readily be implemented to include any desired number of models 412 that may include any required type of information. In the FIG. 5 embodiment, each model 412 from HMMs 212 may correspond to a different particular phone from a predetermined phone set for use with recognizer 314 (FIG. 3).

Figure 5:
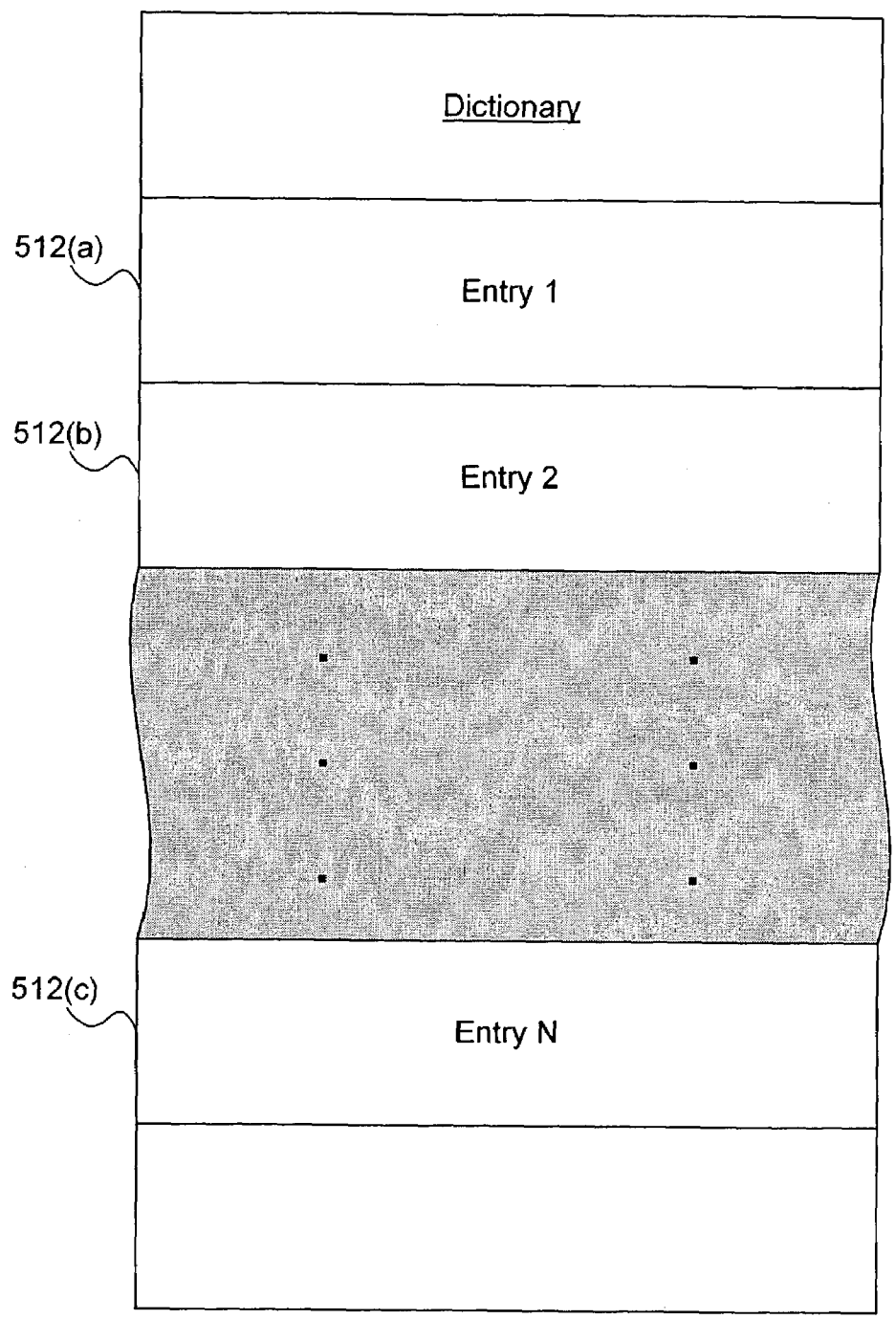
FIG. 5 is a diagram of one embodiment of the dictionary of FIG. 2, in accordance with the present invention.

Referring now to FIG. 5, a block diagram of the dictionary 214 of FIG. 2 is shown, in accordance with one embodiment of the present invention. In the FIG. 5 embodiment, dictionary 214 may preferably include an entry 1 (512($a$)) through an entry N (512($c$)). In alternate embodiments, dictionary 214 may readily include various other elements or functionalities in addition to, or instead of, those elements or functionalities discussed in conjunction with the FIG. 5 embodiment.

In the FIG. 5 embodiment, dictionary 214 may readily be implemented to include any desired number of entries 512 that may include any required type of information. In the FIG. 5 embodiment, as discussed above in conjunction with FIG. 3, each entry 512 from dictionary 214 may also include a corresponding phone string of individual phones from a pre-determined phone set. The individual phones of the foregoing phone string preferably form a sequential representation of the pronunciation of a corresponding word from dictionary 214. One embodiment of a dictionary entry 512 is further discussed below in conjunction with FIG. 6.

Figure 6:
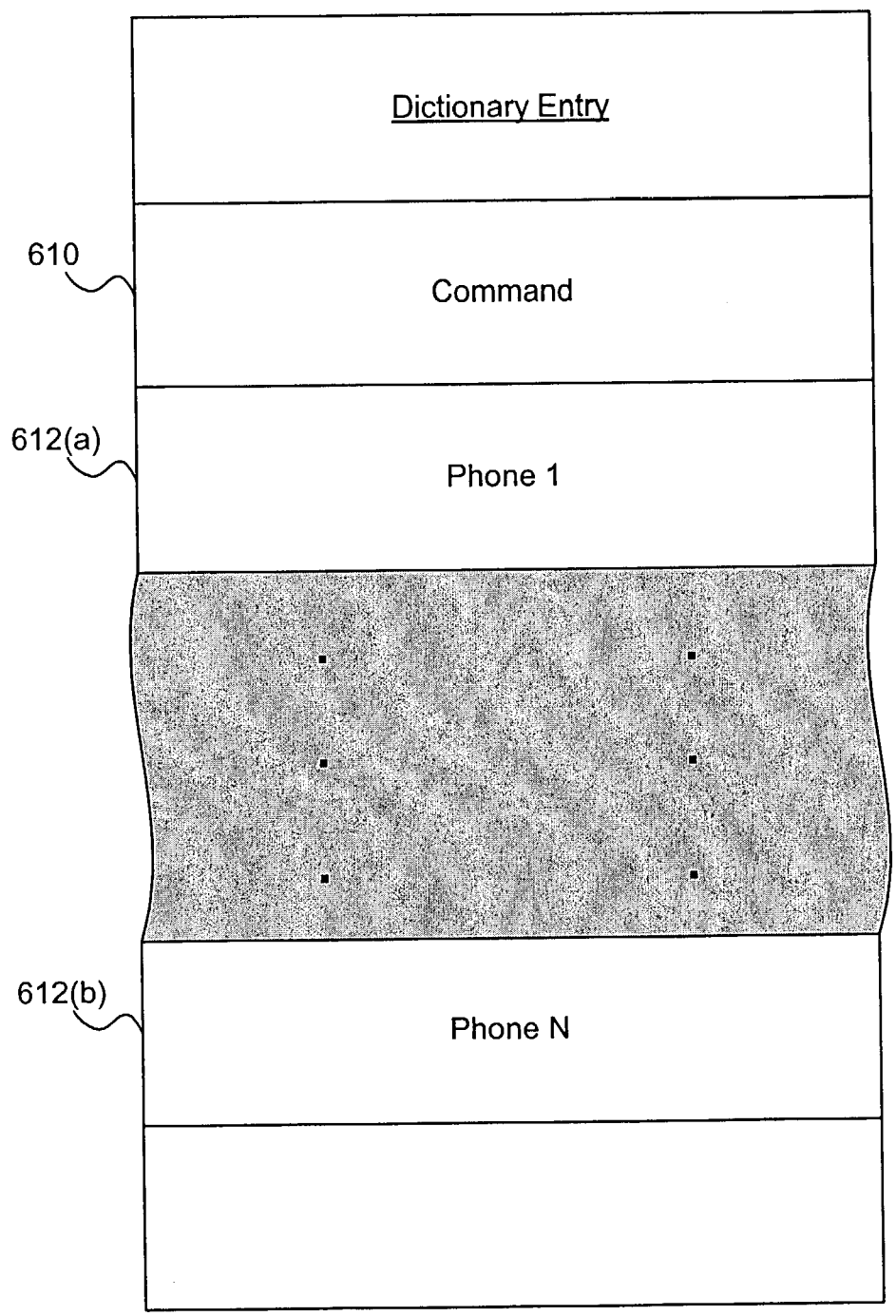
FIG. 6 is a diagram of a dictionary entry of FIG. 5, in accordance with one embodiment of the present invention.

Referring now to FIG. 6, a diagram of an exemplary FIG. 5 dictionary entry 512 is shown, in accordance with one embodiment of the present invention. In alternate embodiments, the present invention may readily perform speech recognition using dictionary entries with various other elements or functionalities in addition to, or instead of, those elements or functionalities discussed in conjunction with the FIG. 6 embodiment.

In the FIG. 6 embodiment, dictionary entry 512 may include a particular command 610 from a vocabulary that recognizer 314 (FIG. 3) is designed to recognize. In various embodiments, command 610 may be any type of utterance or speech, including a sentence, a phrase, a command, a question, or a word that may be represented according to an appropriate representation scheme. In addition, dictionary entry 512 may include a phone string that represents the sequential aural characteristics of command 610. The phone string associated with command 610 may be comprised of a series of phones from a pre-determined phone set for use with recognizer 314. In the FIG. 6 embodiment, the foregoing phone string may include a phone 1 (612(a)) through a phone N (612(a)). The utilization of dictionary entries 512 is further discussed below in conjunction with FIG. 8.

Referring now to FIG. 7, a diagram 710 illustrating several commands 610 (FIG. 6) with associated speech particles is shown, in accordance with one embodiment of the present invention. In alternate embodiments, the present invention may readily utilize various other speech particle techniques or functionalities in addition to, or instead of, those techniques or functionalities discussed in conjunction with the FIG. 7 embodiment.

In certain languages, including the Cantonese language of southern China, a phrase-ending particle may portray a speaker's mood while not changing the core meaning of a phrase or command. In the FIG. 7 embodiment, block 714 illustrates an assertive-particle context in which a particular command is not followed by any type of associated particle. As shown in the FIG. 7 diagram 710, the foregoing assertive-particle context indicates an abrupt or assertive mood of the speaker.

In addition, block 916 illustrates a neutral-particle context in which a particular command is followed by an associated particle "aa3". As shown in the FIG. 7 diagram 710, the foregoing neutral-particle context indicates a neutral mood of the speaker. Furthermore, block 918 illustrates a polite-particle context in which a particular command is followed by an associated particle "laa1". As shown in the FIG. 7 diagram 710, the foregoing polite-particle context indicates a polite command or request as the mood of the speaker. The utilization of the foregoing particles is further illustrated below in conjunction with FIG. 8.

Figure 8:
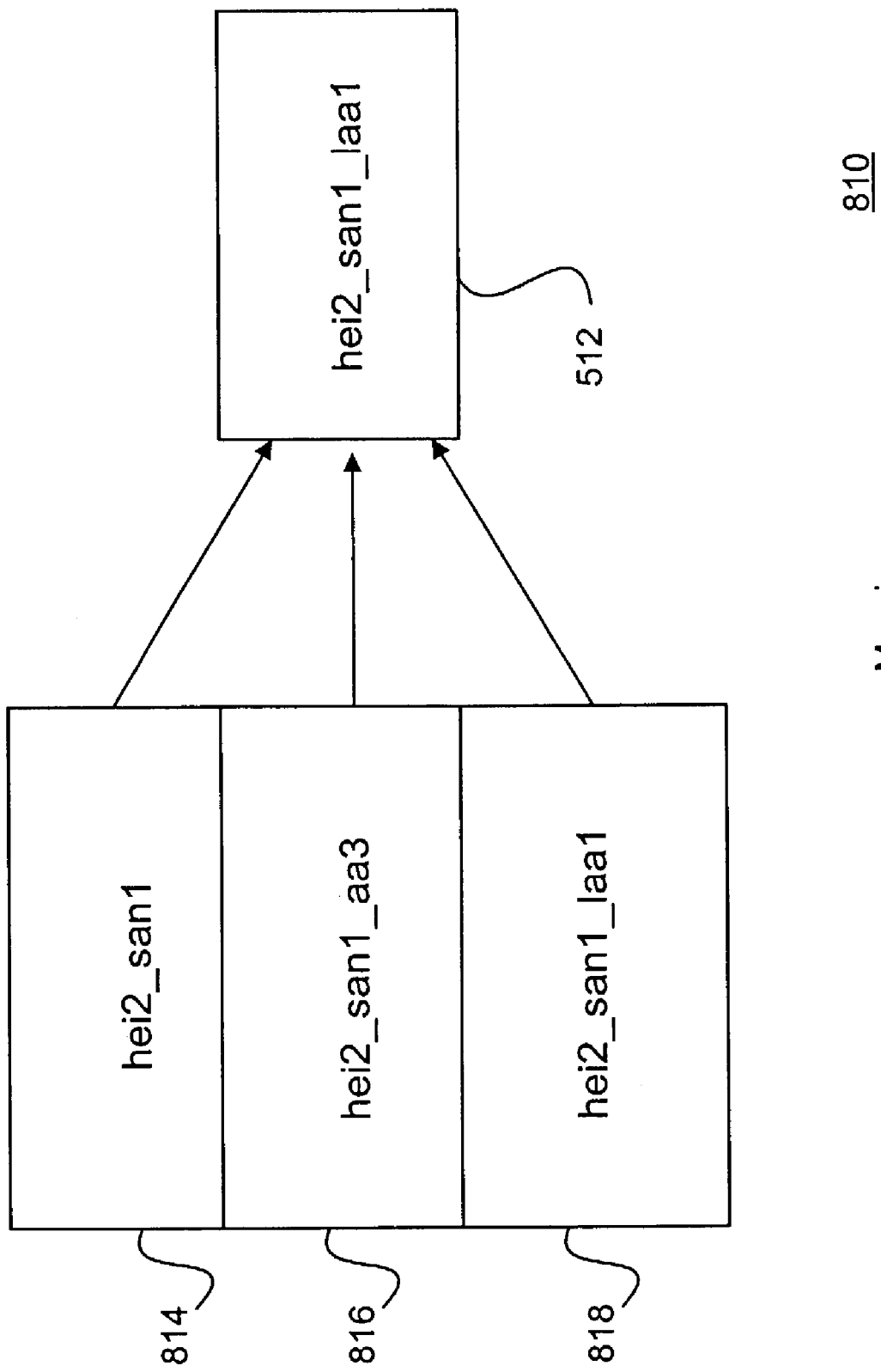
FIG. 8 is a diagram illustrating a technique for implementing a merged dictionary, in accordance with one embodiment of the present invention.

Referring now to FIG. 8, an exemplary diagram 810 illustrating a technique for implementing a merged dictionary is shown, in accordance with one embodiment of the present invention. In alternate embodiments, the present invention may readily implement a merged dictionary by using various other techniques or functionalities in addition to, or instead of, those techniques or functionalities discussed in conjunction with the FIG. 8 embodiment.

In the FIG. 8 example, for purposes of illustration, diagram 810 and the following Table I are presented to represent sounds from the Cantonese language of southern China. Since Cantonese is typically written using Chinese characters instead of the Roman alphabet, the FIG. 7 diagram 810 and the following Table I are presented by utilizing a Cantonese romanization scheme known as "jyutping" which has been developed by The Linguistic Society of Hong Kong (LSHK). Further information regarding "jyutping" and the Linguistic Society of Hong Kong may be found on the World Wide Web at cpct91.cityu.edu.hk/lshk. In alternate embodiments, the present invention may utilize merged dictionaries that are represented in various other types of romanization schemes, including merged dictionaries for any other appropriate type of language.

Recognition errors by recognizer 314 (FIG. 3) may result from incorrect analysis of two or more phonetically similar commands that are mistaken for each other. The merged dictionary of the present invention advantageously prevents incorrectly recognizing one similar phrase for another similar phrase by mapping similar phrases with the same basic meaning into the same dictionary entry 512.

For purposes of illustrating various merging principles of the present invention, in the FIG. 8 example, block 814 includes an exemplary Cantonese command "hei2_san1" (stand up) in the assertive-particle context of foregoing FIG. 7 without any type of attached particle. In block 816, the same command "hei2_san1" is followed by a particle "aa3" in the neutral-particle context of FIG. 7. Similarly, in block 818, the same command "hei2_san1" is followed by a particle "laa1" in the polite-particle context of FIG. 7. In accordance with the present invention, the three different particle contexts (blocks 814, 816, and 818) for the same root command (hei2_san1) may advantageously be merged into the same command 512 in vocabulary dictionary 214. In certain embodiments, all particle contexts may be merged into a dictionary entry with the polite-particle context. The present invention may be utilized in conjunction with any particle(s). For example, in certain embodiments, the particles may include, but are not limited to, "a1 ", "aa3", "laa3", "lo3", "o3", "ga3", and "ge3".

In addition, in certain embodiments, the merged dictionary may also merge two dissimilar phrases that have the same basic meaning into the same dictionary entry 512. In the FIG. 8 embodiment, the merged dictionary may also provide certain exceptions for altering particles (such as Cantonese particles "maa3" and "ne1") that substantially change the meaning of a root phrase. For example, in Cantonese, adding the particle "maa3" to the end of a sentence converts that sentence into a question, and therefore merging would not be appropriate for purposes of accurate speech recognition. The merged dictionary may represent the various sounds of the Cantonese language without utilizing corresponding tonal information as part of the different phone strings.

A merged dictionary utilizing the foregoing techniques may thus be created to provide more accurate recognition of several variations of a single root phrase or command. For purposes of illustration, one such embodiment of a merged dictionary is presented below as Table I which includes commands 610 on the left side with corresponding phone strings of phones 612 on the right to represent pronunciation of the corresponding commands 610. In alternate embodiments, merged dictionaries may be organized in various other ways than that that shown below in Table I.

TABLE I

| | |
|---|---|
| aai1__bou4: | sil aa b ou sil |
| aai1__bou4: | sil aai b ou sil |
| aai1__bou4: | sil ng aai b ou sil |
| baai1__baai3: | sil b aai b aai sil |
| baai2__go3__pou1__si2: | sil b aai g o p ou s i sil |
| bei2__jat1__go3__zi6__ngo5: | sil b ei j a t g o z i ng o sil |
| bei2__jat1__go3__zi6__ngo5: | sil b ei j a t g o z i o sil |
| caa4__ngo5__ge3__seon3: | sil c a ng o g e i m eu sil |
| caa4__ngo5__ge3__seon3: | sil c a ng o g e s eo n sil |
| caa4__ngo5__ge3__seon3: | sil c aa o g e i m eu sil |
| caa4__ngo5__ge3__seon3: | sil c aa o g e s eo n sil |
| caa4__seon3: | sil c aa i m eu sil |
| caa4__seon3: | sil c aa s eo n sil |
| caa4__seon3: | sil c e k i m eu sil |
| co5__dai1: | sil c o d ai sil |
| co5__dai1: | sil c o d ai l aa sil |
| co5__dai1: | sil s i cl sil |
| daa2__kyun4: | sil d aa k yu n sil |
| daa2__kyun4: | sil h eoi d aa g aau sil |
| daa2__kyun4: | sil k yu n g i cl sil |
| dai6__jat1__jip6: | sil d ai j a t j i cl sil |
| dai6__jip6: | sil d ai j i j i cl sil |
| dai6__ji6__zek3__sau2: | sil d ai j i z e k s au sil |
| dai6__ng5__jip6: | sil d ai m j i cl sil |
| dai6__ng5__jip6: | sil d ai ng j i cl sil |
| dai6__saam1__jip6: | sil d ai s aa m j i cl sil |
| dai6__sei3__jip6: | sil d ai s ei j i cl sil |
| dai6__seng1__di1__laa1: | sil d ai s e ng d i sil |
| dai6__seng1__di1__laa1: | sil d ai s e ng d i l aa sil |
| dong2__dak1__hou2: | sil d o ng d a k h ou sil |
| dong2__dak1__hou2: | sil z i p d a k h ou sil |
| duk6__dai6__jat1__jip6: | sil d u k d ai j a t j i cl sil |
| duk6__dai6__ji6__jip6: | sil d u k d ai j i j i cl sil |
| duk6__dai6__ng5__jip6: | sil d u k d ai m j i cl sil |
| duk6__dai6__ng5__jip6: | sil d u k d ai ng j i cl sil |
| duk6__dai6__saam1__jip6: | sil d u k d ai s aa m j i cl sil |
| duk6__dai6__sei3__jip6: | sil d u k d ai s ei j i cl sil |
| duk6__haa6__jat1__fung1__seon3: | sil d u k h aa j a t f u ng s eo n sil |
| duk6__haa6__jat1__fung1__seon3: | sil d u k h aa j a t g o i m eu sil |
| duk6__jyun4__seon3__gin2: | sil d u k j yu n s eo n g i n sil |
| duk6__jyun4__seon3__gin2: | sil t ai j yu n s eo n g i n sil |
| duk6__ngo5__ge3__seon3: | sil d u k ng o g e s eo n sil |
| duk6__ngo5__ge3__seon3: | sil d u k o g e s eo n sil |
| duk6__seon3: | sil d u k s eo n sil |
| duk6__seon3__jing4__sik1: | sil d u k s eo n j i ng s i cl sil |
| duk6__soeng6__jat1__fung1__seon3: | sil d u k s oe ng j a t f u ng sil |
| duk6__soeng6__jat1__fung1__seon3: | sil d u k s oe ng j a t f u ng i m eu sil |
| duk6__soeng6__jat1__fung1__seon3: | sil d u k s oe ng j a t f u ng s eo n sil |
| duk6__soeng6__jat1__fung1__seon3: | sil d u k s oe ng j a t g o i m eu sil |
| faai3__di1__laa1: | sil f aai d i sil |
| faai3__di1__laa1: | sil f aai d i l aa sil |
| faai3__di1__laa1: | sil g aa c u cl sil |
| faan1__heoi3__fan3__laa1: | sil f aa n h eoi f a n l aa sil |
| faan1__heoi3__soeng5__jat1__fung1__seon3: | sil f aa n h eoi s oe ng j a t f u ng sil |
| faan1__heoi3__soeng5__jat1__fung1__seon3: | sil f aa n h eoi s oe ng j a t f u ng i m eu sil |
| faan1__heoi3__soeng5__jat1__fung1__seon3: | sil f aa n h eoi s oe ng j a t f u ng s eo n sil |
| faan1__heoi3__soeng5__jat1__fung1__seon3: | sil f aa n h eoi s oe ng j a t g o i m eu sil |
| fai6__laa1: | sil f ai l aa sil |
| fan3__jat1__zan6: | sil f a n j a t z a n sil |
| gam3__dak1__ji3__ge3: | sil g a m d a k j i g e sil |
| gam3__dak1__ji3__ge3: | sil h ou d a k j i sil |
| gam3__ho2__ngoi3__ge3: | sil g a m h o ng oi g e sil |
| gam3__ho2__ngoi3__ge3: | sil h ou h o ng oi sil |
| git3__cuk1__duk6__seon3__jing4__sik1: | sil g i t c u k d u k s eo n j i ng s i cl sil |
| git3__cuk1__duk6__seon3__jing4__sik1: | sil j yu n s i ng d u k s eo n j i ng s i cl sil |
| giu3__jan4__laa1: | sil g iu j a n l aa sil |
| giu3__jan4__laa1: | sil s ei h aa l ou sil |
| giu3__jan4__laa1: | sil t u ng h eoi s ei h aa l ou sil |
| giu3__jan4__laa1: | sil t u ng k eoi s ei h aa l ou sil |
| go3__bo1__hai2__bin1__aa3: | sil g o b o h ai b i n aa sil |
| go3__bo1__hai2__bin1__aa3: | sil g o b o h ai b i n d ou aa sil |
| go3__bo1__hai2__bin1__aa3: | sil g o b o h ai b i n d ou o sil |
| go3__bo1__hai2__bin1__aa3: | sil g o b o h ai b i n o sil |
| go3__bo1__hai2__bin1__aa3: | sil g o b o h eoi z o b i n aa sil |
| go3__bo1__hai2__bin1__aa3: | sil g o b o h eoi z o b i n d ou aa sil |

TABLE I-continued

| | |
|---|---|
| go3_bo1_hai2_bin1_aa3: | sil g o b o h eoi z o b i n d ou o sil |
| go3_bo1_hai2_bin1_aa3: | sil g o b o h eoi z o b i n o sil |
| goi2_meng2: | sil g oi m e ng sil |
| gui6_m4_gui6_aa3: | sil g ui m g ui aa sil |
| gui6_m4_gui6_aa3: | sil g ui m g ui o sil |
| gui6_m4_gui6_aa3: | sil l ei g ui m aa sil |
| gui6_m4_gui6_aa3: | sil l ei g ui m g ui aa sil |
| gui6_m4_gui6_aa3: | sil l ei g ui m g ui o sil |
| gui6_m4_gui6_aa3: | sil n ei g ui m aa sil |
| gui6_m4_gui6_aa3: | sil n ei g ui m g ui aa sil |
| gui6_m4_gui6_aa3: | sil n ei g ui m g ui o sil |
| gwaan1_gin6_ci4: | sil g w aa n g i n c i sil |
| haa6_jat1_fung1_seon3: | sil h aa j a t f u ng i m eu sil |
| haa6_jat1_fung1_seon3: | sil h aa j a t f u ng s eo n sil |
| haa6_jat1_fung1_seon3: | sil h aa j a t g o i m eu sil |
| haa6_jat1_fung1_seon3: | sil h eoi h aa j a t f u ng i m eu sil |
| haa6_jat1_fung1_seon3: | sil h eoi h aa j a t f u ng s eo n sil |
| haa6_jat1_fung1_seon3: | sil h eoi h aa j a t g o i m eu sil |
| haai1: | sil h aai sil |
| haai1: | sil l ei h ou sil |
| haai1: | sil n ei h ou sil |
| hap6_maai4_zeoi2: | sil h a p m aai g o z eoi sil |
| hap6_maai4_zeoi2: | sil h a p m aai z eoi sil |
| hei2_san1: | sil h ei s a n sil |
| hei2_san1: | sil h ei s a n aa sil |
| hei2_san1: | sil h ei s a n l aa sil |
| hei2_san1: | sil h ei s a n o sil |
| hei2_san1: | sil k ei h ei s a n sil |
| hei2_san1: | sil k ei h ei s a n aa sil |
| hei2_san1: | sil k ei h ei s a n l aa sil |
| hei2_san1: | sil k ei h ei s a n o sil |
| heoi3_haang4_haa5_laa1: | sil h aa ng h aa sil |
| heoi3_haang4_haa5_laa1: | sil h aa n h aa sil |
| heoi3_haang4_haa5_laa1: | sil h eoi h aa ng h aa l aa sil |
| heoi3_haang4_haa5_laa1: | sil h eoi h aa n h aa l aa sil |
| heoi3_waan2_laa1: | sil h eoi w aa n aa sil |
| heoi3_waan2_laa1: | sil h eoi w aa n l aa sil |
| heoi3_waan2_laa1: | sil h eoi w aa n o sil |
| heoi3_waan2_laa1: | sil w aa n aa sil |
| heoi3_waan2_laa1: | sil w aa n l aa sil |
| heoi3_waan2_laa1: | sil w aa n o sil |
| heoi3_zap1_bo1_laa1: | sil f aai d i h eoi w a n g o b o l aa sil |
| heoi3_zap1_bo1_laa1: | sil h eoi d aa m b o l aa sil |
| heoi3_zap1_bo1_laa1: | sil h eoi w a n g o b o l aa sil |
| heoi3_zap1_bo1_laa1: | sil h eoi z a p b o l aa sil |
| hoeng3_cin4: | sil h aa ng h eoi c i n b i n sil |
| hoeng3_cin4: | sil h aa ng h eoi c i n m i n sil |
| hoeng3_cin4: | sil h aa n h eoi c i n b i n sil |
| hoeng3_cin4: | sil h aa n h eoi c i n m i n sil |
| hoeng3_cin4: | sil h eoi c i n b i n sil |
| hoeng3_cin4: | sil h eoi c i n m i n sil |
| hoeng3_cin4: | sil h oe ng c i n sil |
| hoeng3_hau6: | sil f aa n h eoi l aa sil |
| hoeng3_hau6: | sil h eoi h au b i n sil |
| hoeng3_hau6: | sil h eoi h au m i n sil |
| hoeng3_hau6: | sil h oe ng h au sil |
| hoi1_ci2_bei2_coi3: | sil b ei c oi h oi c i sil |
| hoi1_ci2_bei2_coi3: | sil h oi c i b ei c oi sil |
| hoi1_ci2: | sil h oi c i sil |
| hou2_jai5_aa3: | sil g a m j ai g aa sil |
| hou2_jai5_aa3: | sil h ou j ai aa sil |
| hou2_jai5_aa3: | sil h ou j ai o sil |
| hung1_sau2_dou6: | sil h u ng s au d ou sil |
| jap6_kau4: | sil j a p k au sil |
| jat1_ji6_saam1_siu3: | sil j a t j i s aa m s iu sil |
| jau5_mou5_seon3_aa3: | sil j au m ou s eo n aa sil |
| jau5_mou5_seon3_aa3: | sil j au m ou s eo n o sil |
| jau5_mou5_seon3_aa3: | sil ng o j au m ou s eo n aa sil |
| jau5_mou5_seon3_aa3: | sil ng o j au m ou s eo n o sil |
| jau5_mou5_seon3_aa3: | sil o j au m ou s eo n aa sil |
| jau5_mou5_seon3_aa3: | sil o j au m ou s eo n o sil |
| jau5_mou5_si6_aa3: | sil d i m aa sil |
| jau5_mou5_si6_aa3: | sil d i m o sil |
| jau5_mou5_si6_aa3: | sil j au m ou s i aa sil |
| jau5_mou5_si6_aa3: | sil j au m ou s i o sil |
| jau5_mou5_si6_aa3: | sil l ei d i m aa sil |
| jau5_mou5_si6_aa3: | sil l ei d i m o sil |
| jau5_mou5_si6_aa3: | sil l ei j au m ou s i aa sil |
| jau5_mou5_si6_aa3: | sil l ei j au m ou s i o sil |

TABLE I-continued

| | |
|---|---|
| jau5_mou5_si6_aa3: | sil l ei m ou s i a m aa sil |
| jau5_mou5_si6_aa3: | sil n ei d i m aa sil |
| jau5_mou5_si6_aa3: | sil n ei d i m o sil |
| jau5_mou5_si6_aa3: | sil n ei j au m ou s i aa sil |
| jau5_mou5_si6_aa3: | sil n ei j au m ou s i o sil |
| jau5_mou5_si6_aa3: | sil n ei m ou s i a m aa sil |
| jau6_min6: | sil h eoi j au b i n sil |
| jau6_min6: | sil h eoi j au m i n sil |
| jau6_min6: | sil j au b i n sil |
| jau6_min6: | sil j au m i n sil |
| ji4_gaa1_gei2_dim2_aa3: | sil j i g aa g ei d i m sil |
| ji4_gaa1_gei2_dim2_aa3: | sil j i g aa g ei d i m aa sil |
| ji4_gaa1_gei2_dim2_aa3: | sil j i g aa g ei d i m o sil |
| ji4_gaa1_gei2_dim2_aa3: | sil j i g aa g ei d i m z u ng sil |
| ji4_gaa1_gei2_dim2_aa3: | sil j i g aa g ei d i m z u ng aa sil |
| ji4_gaa1_gei2_dim2_aa3: | sil j i g aa g ei d i m z u ng o sil |
| jing2_soeng2_laa1: | sil j i ng s oe ng sil |
| jing2_soeng2_laa1: | sil j i ng s oe ng aa sil |
| jing2_soeng2_laa1: | sil j i ng s oe ng l aa sil |
| jing2_soeng2_laa1: | sil j i ng s oe ng o sil |
| jing2_soeng2_laa1: | sil j i ng z oe ng s oe ng sil |
| jiu3_heoi3_fan3_laa3: | sil j iu f a n g aau l aa sil |
| jiu3_heoi3_fan3_laa3: | sil j iu h eoi f a n l aa sil |
| jiu3_m4_jiu3_caa1_din6_aa3: | sil j iu c aa d i n m aa sil |
| jiu3_m4_jiu3_caa1_din6_aa3: | sil j iu m j iu c aa d i n aa sil |
| jiu3_m4_jiu3_caa1_din6_aa3: | sil j iu m j iu c aa d i n o sil |
| laa6_tei1: | sil l aa t ei sil |
| laang5_zing6_di1_laa1: | sil l aa ng z i ng d i l aa sil |
| laang5_zing6_di1_laa1: | sil l aa n z i ng d i l aa sil |
| ling6_zyun3_min6: | sil l i ng z yu n m i n sil |
| ling6_zyun3_min6: | sil l i ng z yu n s a n sil |
| ling6_zyun3_min6: | sil z yu n w aa n sil |
| m4_goi1: | sil d o z e sil |
| m4_goi1: | sil m g oi sil |
| m4_goi1: | sil m g oi s aai sil |
| m4_hou2_cou4_laa1: | sil m h ou c ou l aa sil |
| m4_hou2_cou4_laa1: | sil s au s e ng l aa sil |
| m4_hou2_cou4_laa1: | sil z i ng d i l aa sil |
| m4_hou2_fai6_laa1: | sil m h ou f ai l aa sil |
| m4_zeon2_aa3: | sil m d a cl sil |
| m4_zeon2_aa3: | sil m h o j i sil |
| m4_zeon2_aa3: | sil m h ou g a m j ai l aa sil |
| m4_zeon2_aa3: | sil m z eo n aa sil |
| m4_zeon2_aa3: | sil m z eo n g a m j oe ng sil |
| m4_zeon2_aa3: | sil m z eo n o sil |
| maa1_kaa6_won4: | sil m aa k aa w o n sil |
| maak3_daai6_hau2: | sil d aa h oi sil |
| maak3_daai6_hau2: | sil m aa k d aai h au sil |
| maak3_daai6_hau2: | sil m aa k d aai h au aa sil |
| maak3_daai6_hau2: | sil m aa k d aai h au o sil |
| maan5_ngon1: | sil m aa n ng o n sil |
| maan5_ngon1: | sil m aa n o n sil |
| nei5_gei2_seoi3_aa3: | sil l ei g ei d o s eoi aa sil |
| nei5_gei2_seoi3_aa3: | sil l ei g ei d o s eoi o sil |
| nei5_gei2_seoi3_aa3: | sil l ei g ei s eoi aa sil |
| nei5_gei2_seoi3_aa3: | sil l ei g ei s eoi o sil |
| nei5_gei2_seoi3_aa3: | sil n ei g ei d o s eoi aa sil |
| nei5_gei2_seoi3_aa3: | sil n ei g ei d o s eoi a sil |
| nei5_gei2_seoi3_aa3: | sil n ei g ei s eoi aa sil |
| nei5_gei2_seoi3_aa3: | sil n ei g ei s eoi o sil |
| nei5_giu3_mat1_je5_meng2_aa3: | sil l ei g iu m a t j e m e ng aa sil |
| nei5_giu3_mat1_je5_meng2_aa3: | sil l ei g iu m a t j e m e ng o sil |
| nei5_giu3_mat1_je5_meng2_aa3: | sil n ei g iu m a t j e m e ng aa sil |
| nei5_giu3_mat1_je5_meng2_aa3: | sil n ei g iu m a t j e m e ng o sil |
| ngaak1_sau2: | sil aa k aa k s au sil |
| ngaak1_sau2: | sil aa k ng aa k s au sil |
| ngaak1_sau2: | sil aa k s au sil |
| ngaak1_sau2: | sil aa k s au l aa sil |
| ngaak1_sau2: | sil ng aa k aa k s au sil |
| ngaak1_sau2: | sil ng aa k ng aa k s au sil |
| ngaak1_sau2: | sil ng aa k s au sil |
| ngaak1_sau2: | sil ng aa k s au l aa sil |
| ngaap3: | sil aa cl sil |
| ngaap3: | sil ng aa cl sil |
| ngo5_dei6_waan3_lo4: | sil ng o d ei w aa n l aa sil |
| ngo5_dei6_waan3_lo4: | sil ng o d ei w aa n l o sil |
| ngo5_dei6_waan3_lo4: | sil o d ei w aa n l aa sil |
| ngo5_dei6_waan3_lo4: | sil o d ei w aa n l o sil |
| ngo5_hai2_dou6_aa3: | sil l i d ou aa sil |

TABLE I-continued

| | |
|---|---|
| ngo5_hai2_dou6_aa3: | sil l i d ou a sil |
| ngo5_hai2_dou6_aa3: | sil ng o h ai d ou aa sil |
| ngo5_hai2_dou6_aa3: | sil ng o h ai d ou o sil |
| ngo5_hai2_dou6_aa3: | sil ng o h ai l i d ou aa sil |
| ngo5_hai2_dou6_aa3: | sil ng o h ai l i d ou o sil |
| ngo5_hai2_dou6_aa3: | sil ng o h ai n i d ou aa sil |
| ngo5_hai2_dou6_aa3: | sil ng o h ai n i d ou o sil |
| ngo5_hai2_dou6_aa3: | sil n i d ou aa sil |
| ngo5_hai2_dou6_aa3: | sil n i d ou o sil |
| ngo5_hai2_dou6_aa3: | sil o h ai d ou aa sil |
| ngo5_hai2_dou6_aa3: | sil o h ai d ou o sil |
| ngo5_hai2_dou6_aa3: | sil o h ai l i d ou aa sil |
| ngo5_hai2_dou6_aa3: | sil o h ai l i d ou o sil |
| ngo5_hai2_dou6_aa3: | sil o h ai n i d ou aa sil |
| ngo5_hai2_dou6_aa3: | sil o h ai n i d ou o sil |
| ngo5_hou2_zung1_ji3_nei5: | sil ng o h ou z u ng j i l ei sil |
| ngo5_hou2_zung1_ji3_nei5: | sil ng o h ou z u ng j i n ei sil |
| ngo5_hou2_zung1_ji3_nei5: | sil ng o z an h ai z u ng j i l ei sil |
| ngo5_hou2_zung1_ji3_nei5: | sil ng o z an h ai z u ng j i n ei sil |
| ngo5_hou2_zung1_ji3_nei5: | sil ng o z u ng j i l ei sil |
| ngo5_hou2_zung1_ji3_nei5: | sil ng o z u ng j i n ei sil |
| ngo5_hou2_zung1_ji3_nei5: | sil o h ou z u ng j i l ei sil |
| ngo5_hou2_zung1_ji3_nei5: | sil o h ou z u ng j i n ei sil |
| ngo5_hou2_zung1_ji3_nei5: | sil o z an h ai z u ng j i l ei sil |
| ngo5_hou2_zung1_ji3_nei5: | sil o z an h ai z u ng j i n ei sil |
| ngo5_hou2_zung1_ji3_nei5: | sil o z u ng j i l ei sil |
| ngo5_hou2_zung1_ji3_nei5: | sil o z u ng j i n ei sil |
| paa1_hai2_dou6: | sil f a n d ai sil |
| paa1_hai2_dou6: | sil f a n d ai l aa sil |
| paa1_hai2_dou6: | sil p aa h ai d ou sil |
| paa1_hai2_dou6: | sil t aa n h ai d ou sil |
| pui4_ngo5_king1_haa5_gaai2_a2: | sil k i ng h aa g aai l o sil |
| pui4_ngo5_king1_haa5_gaai2_a2: | sil ng o d ei k i ng h aa g aai l o sil |
| pui4_ngo5_king1_haa5_gaai2_a2: | sil o d ei k i ng h aa g aai l o sil |
| pui4_ngo5_king1_haa5_gaai2_a2: | sil p ui ng o k i ng h aa g aai a sil |
| pui4_ngo5_king1_haa5_gaai2_a2: | sil p ui o k i ng h aa g aai a sil |
| saan3_maai4: | sil s aa n m aai sil |
| sai2_m4_sai2_hap1_haa5_aa4: | sil f a n m f a n h aa aa sil |
| sai2_m4_sai2_hap1_haa5_aa3: | sil f a n m f a n h aa o sil |
| sai2_m4_sai2_hap1_haa5_aa3: | sil j iu f a n g aau m aa sil |
| sai2_m4_sai2_hap1_haa5_aa3: | sil j iu f a n h aa m aa sil |
| sai2_m4_sai2_hap1_haa5_aa3: | sil j iu h a p h aa m aa sil |
| sai2_m4_sai2_hap1_haa5_aa3: | sil j iu m j iu f a n g aau aa sil |
| sai2_m4_sai2_hap1_haa5_aa3: | sil j iu m j iu f a n g aau o sil |
| sai2_m4_sai2_hap1_haa5_aa3: | sil j iu m j iu h a p h aa aa sil |
| sai2_m4_sai2_hap1_haa5_aa3: | sil j iu m j iu h a p h aa o sil |
| sai2_m4_sai2_hap1_haa5_aa3: | sil l ei j iu f a n g aau m aa sil |
| sai2_m4_sai2_hap1_haa5_aa3: | sil l ei j iu h a p h aa m aa sil |
| sai2_m4_sai2_hap1_haa5_aa3: | sil l ei j iu m j iu f a n g aau aa sil |
| sai2_m4_sai2_hap1_haa5_aa3: | sil l ei j iu m j iu f a n g aau o sil |
| sai2_m4_sai2_hap1_haa5_aa3: | sil l ei j iu m j iu h a p h aa aa sil |
| sai2_m4_sai2_hap1_haa5_aa3: | sil l ei j iu m j iu h a p h aa o sil |
| sai2_m4_sai2_hap1_haa5_aa3: | sil n ei j iu f a n g aau m aa sil |
| sai2_m4_sai2_hap1_haa5_aa3: | sil n ei j iu h a p h aa m aa sil |
| sai2_m4_sai2_hap1_haa5_aa3: | sil n ei j iu m j iu f a n g aau aa sil |
| sai2_m4_sai2_hap1_haa5_aa3: | sil n ei j iu m j iu f a n g aau o sil |
| sai2_m4_sai2_hap1_haa5_aa3: | sil n ei j iu m j iu h a p h aa aa sil |
| sai2_m4_sai2_hap1_haa5_aa3: | sil n ei j iu m j iu h a p h aa o sil |
| sai2_m4_sai2_hap1_haa5_aa3: | sil s ai m s ai f a n g aau aa sil |
| sai2_m4_sai2_hap1_haa5_aa3: | sil s ai m s ai f a n g aau o sil |
| sai2_m4_sai2_hap1_haa5_aa3: | sil s ai m s ai f a n h aa aa sil |
| sai2_m4_sai2_hap1_haa5_aa3: | sil s ai m s ai f a n h aa o sil |
| sai2_m4_sai2_hap1_haa5_aa3: | sil s ai m s ai h a p h aa aa sil |
| sai2_m4_sai2_hap1_haa5_aa3: | sil s ai m s ai h a p h aa o sil |
| sai2_m4_sai2_hap1_haa5_aa3: | sil s ai m s ai t au h aa aa sil |
| sai2_m4_sai2_hap1_haa5_aa3: | sil s ai m s ai t au h aa o sil |
| sai2_m4_sai2_hap1_haa5_aa3: | sil t au m t au h aa aa sil |
| sai2_m4_sai2_hap1_haa5_aa3: | sil t au m t au h aa o sil |
| sai2_m4_sai2_jau1_sik1_aa3: | sil j iu j au s i k m aa sil |
| sai2_m4_sai2_jau1_sik1_aa3: | sil j iu m j iu j au s i k aa sil |
| sai2_m4_sai2_jau1_sik1_aa3: | sil j iu m j iu j au s i k o sil |
| sai2_m4_sai2_jau1_sik1_aa3: | sil s ai m s ai j au s i k aa sil |
| sai2_m4_sai2_jau1_sik1_aa3: | sil s ai m s ai j au s i k o sil |
| sai2_m4_sai2_sik6_faan6_aa3: | sil j iu m j iu s i k f aa n aa sil |
| sai2_m4_sai2_sik6_faan6_aa3: | sil j iu m j iu s i k f aa n o sil |
| sai2_m4_sai2_sik6_faan6_aa3: | sil j iu m j iu s i k j e aa sil |
| sai2_m4_sai2_sik6_faan6_aa3: | sil j iu m j iu s i k j e o sil |
| sai2_m4_sai2_sik6_faan6_aa3: | sil j iu s i k f aa n m aa sil |
| sai2_m4_sai2_sik6_faan6_aa3: | sil j iu s i k j e m aa sil |

TABLE I-continued

| | |
|---|---|
| sai2__m4__sai2__sik6__faan6__aa3: | sil s ai m s ai s i k d i j e aa sil |
| sai2__m4__sai2__sik6__faan6__aa3: | sil s ai m s ai s i k d i j e o sil |
| sai2__m4__sai2__sik6__faan6__aa3: | sil s ai m s ai s i k f aa n aa sil |
| sai2__m4__sai2__sik6__faan6__aa3: | sil s ai m s ai s i k f aa n o sil |
| sai2__m4__sai2__sik6__faan6__aa3: | sil s ai m s ai s i k j e aa sil |
| sai2__m4__sai2__sik6__faan6__aa3: | sil s ai m s ai s i k j e o sil |
| sai2__m4__sai2__sik6__faan6__aa3: | sil s i k m s i k d i j e aa sil |
| sai2__m4__sai2__sik6__faan6__aa3: | sil s i k m s i k d i j e o sil |
| se6__kau4: | sil s e k au sil |
| soeng6__jat1__fung1__seon3: | sil s oe ng j a t f u ng s eo n sil |
| soeng6__jat1__fung1__seon3: | sil s oe ng j a t g o i m eu sil |
| tek3__bo1__laa1: | sil t e cl sil |
| tek3__bo1__laa1: | sil t e k b o sil |
| tek3__bo1__laa1: | sil t e k b o l aa sil |
| tek3__bo1__laa1: | sil t e k g o b o sil |
| tek3__bo1__laa1: | sil t e k l aa sil |
| teng1__ngo5__gong2__laa1: | sil t e ng ng o g o ng sil |
| teng1__ngo5__gang2__laa1: | sil t e ng ng o g o ng l aa sil |
| teng1__ngo5__gong2__laa1: | sil t e ng o g o ng sil |
| teng1__ngo5__gong2__laa1: | sil t e ng o g o ng l aa sil |
| teng1__ngo5__gong2__laa1: | sil t e ng z yu sil |
| ting4__dai1: | sil t i ng d ai sil |
| ting4__dai1: | sil t i ng d ai l aa sil |
| ting4__dai1: | sil t i ng h ai d ou sil |
| ting4__dai1: | sil t i ng h ai d ou l aa sil |
| tiu3__mou5__laa1: | sil t iu m ou sil |
| tiu3__mou5__laa1: | sil t iu m ou l aa sil |
| tou5__m4__tou5__ngo6__aa3: | sil l ei t ou m t ou ng o aa sil |
| tou5__m4__tou5__ngo6__aa3: | sil l ei t ou m t ou ng o o sil |
| tou5__m4__tou5__ngo6__aa3: | sil l ei t ou m t ou o aa sil |
| tou5__m4__tou5__ngo6__aa3: | sil l ei t ou m t ou o o sil |
| tou5__m4__tou5__ngo6__aa3: | sil l ei t ou ng o m aa sil |
| tou5__m4__tou5__ngo6__aa3: | sil l ei t ou o m aa sil |
| tou5__m4__tou5__ngo6__aa3: | sil n ei t ou m t ou ng o aa sil |
| tou5__m4__tou5__ngo6__aa3: | sil n ei t ou m t ou ng o o sil |
| tou5__m4__tou5__ngo6__aa3: | sil n ei t ou m t ou o aa sil |
| tou5__m4__tou5__ngo6__aa3: | sil n ei t ou m t ou o o sil |
| tou5__m4__tou5__ngo6__aa3: | sil n ei t ou ng o m aa sil |
| tou5__m4__tou5__ngo6__aa3: | sil n ei t ou o m aa sil |
| tou5__m4__tou5__ngo6__aa3: | sil t ou m t ou ng o aa sil |
| tou5__m4__tou5__ngo6__aa3: | sil t ou m t ou ng o o sil |
| tou5__m4__tou5__ngo6__aa3: | sil t ou m t ou o aa sil |
| tou5__m4__tou5__ngo6__aa3: | sil t ou m t ou o o sil |
| waa6__bei2__ngo5__zi1__ji4__gaa1__gei2__dim2: | sil w aa b ei ng o z i j i g aa g ei d i m sil |
| waa6__bei2__ngo5__zi1__ji4__gaa1__gei2__dim2: | sil w aa b ei o z i j i g aa g ei d i m sil |
| zan1__hai6__dak1__ji3__laa3: | sil l ei g a m d a k j i g e sil |
| zan1__hai6__dak1__ji3__laa3: | sil n ei g a m d a k j i g e sil |
| zan1__hai6__dak1__ji3__laa3: | sil z an h ai d a k j i l aa sil |
| zan1__hai6__gwaai1__laa3: | sil l ei h ou g w aai aa sil |
| zan1__hai6__gwaai1__laa3: | sil l ei h ou g w aai o sil |
| zan1__hai6__gwaai1__laa3: | sil n ei h ou g w aai aa sil |
| zan1__hai6__gwaai1__laa3: | sil n ei h ou g w aai o sil |
| zan1__hai6__gwaai1__laa3: | sil z an h ai g w aai l aa sil |
| zan1__hai6__zeng3: | sil h ou z e ng sil |
| zan1__hai6__zeng3: | sil z an h ai z e ng sil |
| zau2__laa3: | sil g o l ei l aa sil |
| zau2__laa3: | sil g w o l ei l aa sil |
| zau2__laa3: | sil l ei l aa sil |
| zau2__laa3: | sil ng o d ei z au l aa sil |
| zau2__laa3: | sil o d ei z au l aa sil |
| zau2__laa3: | sil z au l aa sil |
| zau6__faai3__mou5__din6__laa3: | sil z au f aai m ou d i n l aa sil |
| zek3__maau1__lei4__laa3: | sil z e k m aau l ei g a n aa sil |
| zek3__maau1__lei4__laa3: | sil z e k m aau l ei g a n o sil |
| zek3__maau1__lei4__laa3: | sil z e k m aau l ei l aa sil |
| zo2__min6: | sil h eoi z o b i n sil |
| zo2__min6: | sil h eoi z o m i n sil |
| zo2__min6: | sil z o b i n sil |
| zo2__min6: | sil z o m i n sil |
| zoi3__gong2__do1__ci3: | sil z oi g ong d o c i sil |
| zoi3__gong2__do1__ci3: | sil z oi g ong j a t c i sil |
| zou2__san4: | sil z ou s a n sil |
| zyun3__jau6: | sil z yu n j au sil |
| zyun3__zo2: | sil z yu n z o sil |

The invention has been explained above with reference to preferred embodiments. Other embodiments will be apparent to those skilled in the art in light of this disclosure. For example, the present invention may readily be implemented using configurations and techniques other than those described in the preferred embodiments above. Additionally, the present invention may effectively be used in conjunction with systems other than those described above as the preferred embodiments. Therefore, these and other variations upon the preferred embodiments are intended to be covered by the present invention, which is limited only by the appended claims.

What is claimed is:

1. A system for performing a speech recognition procedure, comprising:
    a sound sensor that converts a spoken utterance into input speech data;
    a recognizer configured to compare said input speech data to dictionary entries from a merged dictionary, said merged dictionary being implemented by utilizing a merging technique that maps two or more related phrases with similar meanings to a single one of said dictionary entries, said two or more related phrases each having a different final particle that does not alter a basic shared meaning of said two or more related phrases, said merging technique being based upon a particle context from each of said two or more related phrases, said particle context indicating an intended mood of an initial speaker of said input speech data, each of said two or more related phrases including a command followed by said particle context, one of said two or more related phrases having an assertive particle context to indicate said intended mood of said initial speaker of said input speech data; and
    a processor configured to control said recognizer to perform said speech recognition procedure.

2. The system of claim 1 wherein said assertive particle context includes no final particle after said one of said two or more related phrases.

3. A system for performing a speech recognition procedure, comprising:
    a sound sensor that converts a spoken utterance into input speech data;
    a recognizer configured to compare said input speech data to dictionary entries from a merged dictionary, said merged dictionary being implemented by utilizing a merging technique that maps two or more related phrases with similar meanings to a single one of said dictionary entries, said two or more related phrases each having a different final particle that does not alter a basic shared meaning of said two or more related phrases, said merging technique being based upon a particle context from each of said two or more related phrases, said particle context indicating an intended mood of an initial speaker of said input speech data, each of said two or more related phrases including a command followed by said particle context, one of said two or more related phrases having a neutral particle context to indicate said intended mood of said initial speaker of said input speech data; and
    a processor configured to control said recognizer to perform said speech recognition procedure.

4. The system of claim 3 wherein said neutral particle context includes a final particle "aa3" after said one of said two or more related phrases.

5. A system for performing a speech recognition procedure, comprising:
    a sound sensor that converts a spoken utterance into input speech data;
    a recognizer configured to compare said input speech data to dictionary entries from a merged dictionary, said merged dictionary being implemented by utilizing a merging technique that maps two or more related phrases with similar meanings to a single one of said dictionary entries, said two or more related phrases each having a different final particle that does not alter a basic shared meaning of said two or more related phrases, said merging technique being based upon a particle context from each of said two or more related phrases, said particle context indicating an intended mood of an initial speaker of said input speech data, each of said two or more related phrases including a command followed by said particle context, one of said two or more related phrases having a polite particle context to indicate said intended mood of said initial speaker of said input speech data; and
    a processor configured to control said recognizer to perform said speech recognition procedure.

6. The system of claim 5 wherein said polite particle context includes a final particle "laa1" after said one of said two or more related phrases.

7. A system for performing a speech recognition procedure, comprising:
    a sound sensor that converts a spoken utterance into input speech data;
    a recognizer configured to compare said input speech data to dictionary entries from a merged dictionary, said merged dictionary being implemented by utilizing a merging technique that maps two or more related phrases with similar meanings to a single one of said dictionary entries, said two or more related phrases each having a different final particle that does not alter a basic shared meaning of said two or more related phrases, said merged dictionary being implemented to include dictionary entries that represent phone strings of a Cantonese language without utilizing corresponding tonal information as part of said phone strings; and
    a processor configured to control said recognizer to perform said speech recognition procedure.

8. The system of claim 7 wherein said input speech data includes Cantonese language data, said merged dictionary being configured to accurately represent a pre-determined recognition vocabulary for analyzing said Cantonese language data.

9. The system of claim 7 wherein said recognizer and said processor are implemented as part of a consumer electronics device.

10. The system of claim 7 wherein said merging technique of said merged dictionary prevents said recognizer from mistaking one of said related phrases for another of said related phrases during said speech recognition procedure.

11. The system of claim 7 wherein each of said dictionary entries includes a command and an associated phone string that indicates pronunciation characteristics of said command.

12. The system of claim 11 wherein said recognizer compares said input speech data to Hidden Markov Models for said phone string from each of said commands in said vocabulary dictionary to thereby select a recognized word.

13. The system of claim 7 wherein said merging technique is based upon a particle context from each of said two or more related phrases, said particle context indicating an intended mood of an initial speaker of said input speech data.

14. The system of claim 13 wherein each of said two or more related phrases includes a command followed by said particle context.

15. The system of claim 14 wherein said merged dictionary maps each of said two or more related phrases to a merged dictionary entry corresponding to a polite particle context.

16. The system of claim 14 wherein said particle context includes individual particles "a", "aa", "laa", "lo", "o", "ga", and "ge".

17. The system of claim 7 wherein said merging technique is not utilized with a command that is followed by an altering particle because said altering particle substantially changes what said command means.

18. The system of claim 17 wherein said altering particle includes at least one of a "maa" particle and a "ne" particle that follow said command.

19. The system of claim 7 wherein said merging technique is utilized to map two or more related phrases with non-similar pronunciations but similar meanings to a single one of said dictionary entries.

20. A method for performing a speech recognition procedure, comprising:
converting a spoken utterance into input speech data by using a sound sensor;
utilizing a recognizer for comparing said input speech data to dictionary entries from a merged dictionary, said merged dictionary being implemented with a merging technique that maps two or more related phrases with similar meanings to a single one of said dictionary entries, said two or more related phrases each having a different final particle that does not alter a basic shared meaning of said two or more related phrases, said merging technique being based upon a particle context from each of said two or more related phrases, said particle context indicating an intended mood of an initial speaker of said input speech data, each of said two or more related phrases including a command followed by said particle context, one of said two or more related phrases having an assertive particle context to indicate said intended mood of said initial speaker of said input speech data.

21. The method of claim 20 wherein said assertive particle context includes no final particle after said one of said two or more related phrases.

22. A method for performing a speech recognition procedure, comprising:
converting a spoken utterance into input speech data by using a sound sensor;
utilizing a recognizer for comparing said input speech data to dictionary entries from a merged dictionary, said merged dictionary being implemented with a merging technique that maps two or more related phrases with similar meanings to a single one of said dictionary entries, said two or more related phrases each having a different final particle that does not alter a basic shared meaning of said two or more related phrases, said merging technique being based upon a particle context from each of said two or more related phrases, said particle context indicating an intended mood of an initial speaker of said input speech data, each of said two or more related phrases including a command followed by said particle context, one of said two or more related phrases having a neutral particle context to indicate said intended mood of said initial speaker of said input speech data.

23. The method of claim 22 wherein said neutral particle context includes a final particle "aa3" after said one of said two or more related phrases.

24. A method for performing a speech recognition procedure, comprising:
converting a spoken utterance into input speech data by using a sound sensor;
utilizing a recognizer for comparing said input speech data to dictionary entries from a merged dictionary, said merged dictionary being implemented with a merging technique that maps two or more related phrases with similar meanings to a single one of said dictionary entries, said two or more related phrases each having a different final particle that does not alter a basic shared meaning of said two or more related phrases, said merging technique being based upon a particle context from each of said two or more related phrases, said particle context indicating an intended mood of an initial speaker of said input speech data, each of said two or more related phrases including a command followed by said particle context, one of said two or more related phrases having a polite particle context to indicate said intended mood of said initial speaker of said input speech data.

25. The method of claim 24 wherein said polite particle context includes a final particle "laa1" after said one of said two or more related phrases.

26. A method for performing a speech recognition procedure, comprising:
converting a spoken utterance into input speech data by using a sound sensor;
utilizing a recognizer for comparing said input speech data to dictionary entries from a merged dictionary, said merged dictionary being implemented with a merging technique that maps two or more related phrases with similar meanings to a single one of said dictionary entries, said two or more related phrases each having a different final particle that does not alter a basic shared meaning of said two or more related phrases, said merged dictionary being implemented to include dictionary entries that represent phone strings of a Cantonese language without utilizing corresponding tonal information as part of said phone strings.

27. The method of claim 26 wherein said merging technique is utilized to map two or more related phrases with non-similar pronunciations but similar meanings to a single one of said dictionary entries.

28. The method of claim 26 wherein said input speech data includes Cantonese language data, said merged dictionary being configured to accurately represent a pre-determined recognition vocabulary for analyzing said Cantonese language data.

29. The method of claim 26 wherein said recognizer and said processor are implemented as part of a consumer electronics device.

30. The method of claim 26 wherein said merging technique of said merged dictionary prevents mistaking one of said related phrases for another of said related phrases during said speech recognition procedure.

31. The method of claim 26 wherein each of said dictionary entries includes a command and an associated phone string that indicates pronunciation characteristics of said command.

32. The method of claim 31 wherein said recognizer compares said input speech data to Hidden Markov Models for said phone string from each of said commands in said vocabulary dictionary to thereby select a recognized word.

33. The method of claim 26 wherein said merging technique is based upon a particle context from each of said two or more related phrases, said particle context indicating an intended mood of an initial speaker of said input speech data.

34. The method of claim 33 wherein each of said.two or more related phrases includes a command followed by said particle context.

35. The method of claim 34 wherein said merged dictionary maps each of said two or more related phrases to a merged dictionary entry corresponding to a polite particle context.

36. The method of claim 34 wherein said particle context includes individual particles "a", "aa", "laa", "lo", "o", "ga", and "ge".

37. The method of claim 26 wherein said merging technique is not utilized with a command that is followed by an altering particle because said altering particle substantially changes what said command means.

38. The method of claim 37 wherein said altering particle includes at least one of a "maa" particle and a "ne" particle that follow said command.

* * * * *